US005574615A

United States Patent [19]

Busse et al.

[11] Patent Number: 5,574,615

[45] Date of Patent: Nov. 12, 1996

[54] AIR SPARK GAP FOR DETERMINING THE MAXIMUM VOLTAGE AT A VOLTAGE SURGE SUPPRESSOR

[75] Inventors: Ralf-Dieter Busse; Carsten Storbeck, both of Berlin, Germany

[73] Assignee:. Krone Aktiengesellschaft, Berlin-Zehlendorf, Germany

[21] Appl. No.: 378,191

[22] Filed: Jan. 25, 1995

[30] Foreign Application Priority Data

Jan. 28, 1994 [DE] Germany .......................... 44 03 053.3

[51] Int. Cl.$^6$ ........................................ H02H 1/04

[52] U.S. Cl. ........................................ 361/120; 361/119

[58] Field of Search .................................... 361/120, 117, 361/118, 119, 123, 91, 111, 112; 337/28, 29

[56] References Cited

U.S. PATENT DOCUMENTS 3,898,533 8/1975 Scudner, Jr. ............................ 361/120
4,912,592 3/1990 Flindall et al. ......................... 361/120
5,050,033 9/1991 Pagliuca ................................ 361/120

FOREIGN PATENT DOCUMENTS

3813889C1 4/1989 Germany .

*Primary Examiner*—Jeffrey A. Gaffin
*Assistant Examiner*—Michael Sherry
*Attorney, Agent, or Firm*—McGlew and Tuttle

[57] ABSTRACT

The present invention relates to an air spark gap for determining the maximum voltage at an aged voltage surge suppressor (5) comprising an electrode arrangement in a capsule filled with an inert gas. The voltage surge suppressor is disposed in a voltage surge protection plug. The air spark gap is disposed between two contact members (2, 3 or 4, resp.) parallel to the voltage surge suppressor. The one (2) of the contact members is electrically connected with a contact element (7) resting, in the plugged-on condition of the voltage surge protection plug, resiliently on a surface portion against the other one (3, 4) of the contact members. For an electrical disconnection, an electrical insulation foil (8, 9) having a given thickness is arranged between the contact element and the other one of the contact members, said electrical insulation foil being provided with an opening for forming an air gap therebetween.

16 Claims, 3 Drawing Sheets

FIG.3a
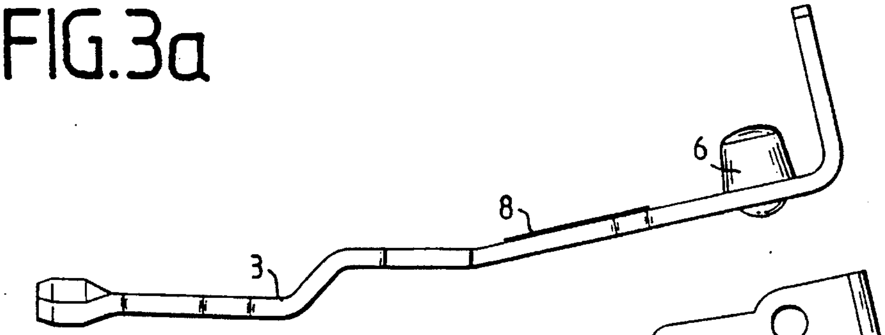
FIG.3b
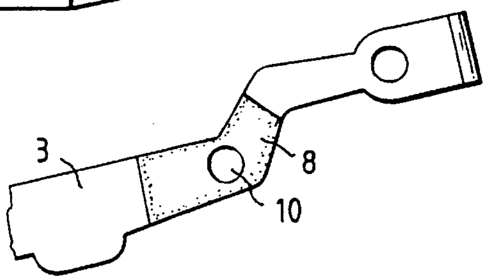
FIG.4a
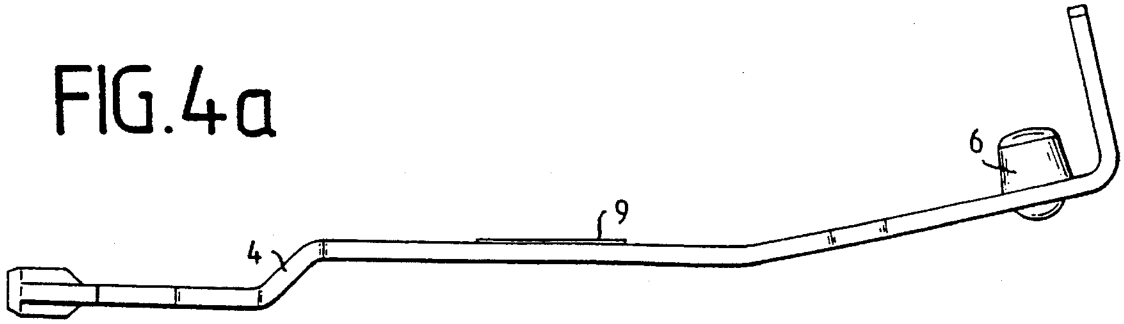
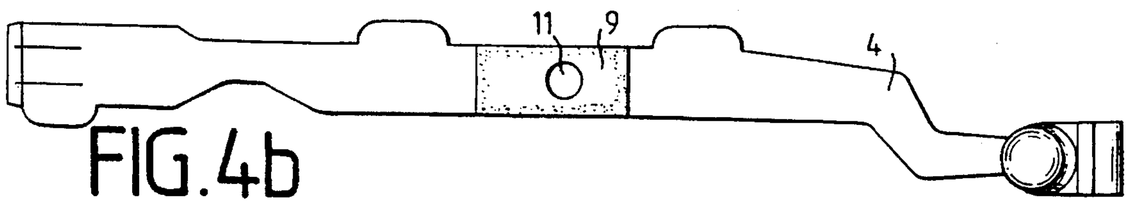
FIG.4b

AIR SPARK GAP FOR DETERMINING THE MAXIMUM VOLTAGE AT A VOLTAGE SURGE SUPPRESSOR

FIELD OF THE INVENTION

The present invention relates to an air spark gap for determining the maximum voltage at a voltage surge suppressor comprising an electrode arrangement in a capsule filled with an inert gas, the air spark gap being disposed between two contact members parallel to the voltage surge suppressor.

BACKGROUND OF THE INVENTION

Voltage surge suppressors for the protection against overvoltages and the overcurrents resulting therefrom are widely used in telecommunication applications. They conventionally comprise an electrode arrangement in a capsule of glass or ceramics filled with an inert gas, such as neon or argon. Such a voltage surge suppressor acts as a voltage-dependent switch forming an arc of high current carrying capability (approx. 2.5 kiloamps to 20 kiloamps) after exceeding the type-dependent ignition voltage. However, these voltage surge suppressors may exhibit aging problems, depending on the duration of use and on the type of the load. A typical problem is the loss of inert gas in the capsule and an increase in replacement thereof by air. Thereby, the response voltage of the voltage surge suppressor is increased such that it will be a multiple (approx. 2,500 to 5,000 volts) of the standard value. It is required therefore, that an additional protection ensuring a certain maximum response voltage be provided. This is commonly in the order of 1,000 to 1,500 volts.

Such a protection can be achieved by a disconnecting spark gap in air. With electrode distances between 0.1 and 0.5 mm response voltages of 0.2 to 0.5 kilovolt can be obtained. These additional disconnecting spark gaps require, however, different geometrical dimensions of the voltage surge suppressor and thus a deviation from the standard sizes; further, the manufacturing costs are increased in a non negligible way.

From DE 38 13 889 C1 there is known in the art a connector or disconnector bank for the telecommunication technique. Onto this bank there can be plugged at least one voltage surge protection plug having a housing wherein there is disposed a voltage surge suppressor.

SUMMARY AND OBJECTS OF THE INVENTION

It is therefore an object of the present invention to provide a voltage surge suppressor with an additional air spark gap such that the relevant test requirements are met without modifying the geometrical dimensions, for instance of the housing of the voltage surge suppressor.

It is further an object of the invention to provide such a voltage surge suppressor wherein the manufacturing costs are only slightly increased.

It is still another object of the invention to provide a voltage surge suppressor wherein the air spark gap is substantially protected from external influences.

According to the invention, an air spark gap for determining the maximum voltage at a voltage surge suppressor is provided comprising an electrode arrangement in a capsule filled with an inert gas. The air spark gap is disposed between two contact members parallel to the voltage surge suppressor. One of the contact members is electrically connected with a contact element resting resiliently on a surface portion against the other one of the contact members. For an electrical disconnection at least one electrical insulation foil, having a given thickness, is arranged therebetween. The electrical insulation foil is provided with an opening for forming an air gap between the other one of the contact members and the contact element.

The voltage surge suppressor is preferably disposed in a voltage surge protection plug, and that in a plugged-on condition of the voltage surge protection plug the contact element rests against the other one of the contact members. The voltage surge protection plug can be plugged onto a connector or disconnector bank for the telecommunication technique. The one of the contact members is connected with a collective earthing (grounding) device, and the other one of the contact members is connected with an a or b-wire. The contact members are preferably adapted in the form of plug-in tongues. The contact element is resiliently pressed by the one of the contact members against the other one of the contact members. The electrical insulation foil preferably has a minimum thickness of 100 μm. The electrical insulation foil is glued on the other one of the contact members. The air spark gap is disposed in the housing of the voltage surge protection plug. The hole in the electrical insulation foil has such a size and/or shape that a strongly inhomogeneous electrical field is formed in the air gap.

By electrically connecting the one of the contact members with a contact element resting resiliently on a surface portion against the other one of the contact members such that for an electrical disconnection an electrical insulation foil having a given thickness is arranged therebetween, the electrical insulation foil being provided with an opening for forming an air gap between the other one of the contact members and the contact element, the disconnecting spark gap can be formed on a tight space between the contact members. The desired electrode distances of the spark gap can be obtained with high precision and in a simple manner. By the surface-type connection between the electrical insulation foil and the other one of the contact members on one hand, and the resilient, surface-type placement of the one of the contact members on the electrical insulation foil on the other hand, a capsulated disconnecting spark gap is obtained, wherein external influences, such as air pressure, air humidity and contaminations, on the breakdown voltage are substantially prevented.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

FIG. **3*a*** is a side view of a contact member for the a-wire;

FIG. **3*b*** is a top view of the contact member for the a-wire;

FIG. **4*a*** is a side view of a contact member for the b-wire;

FIG. **4*b*** is a top view of the contact member for the b-wire; and

Figure 5:
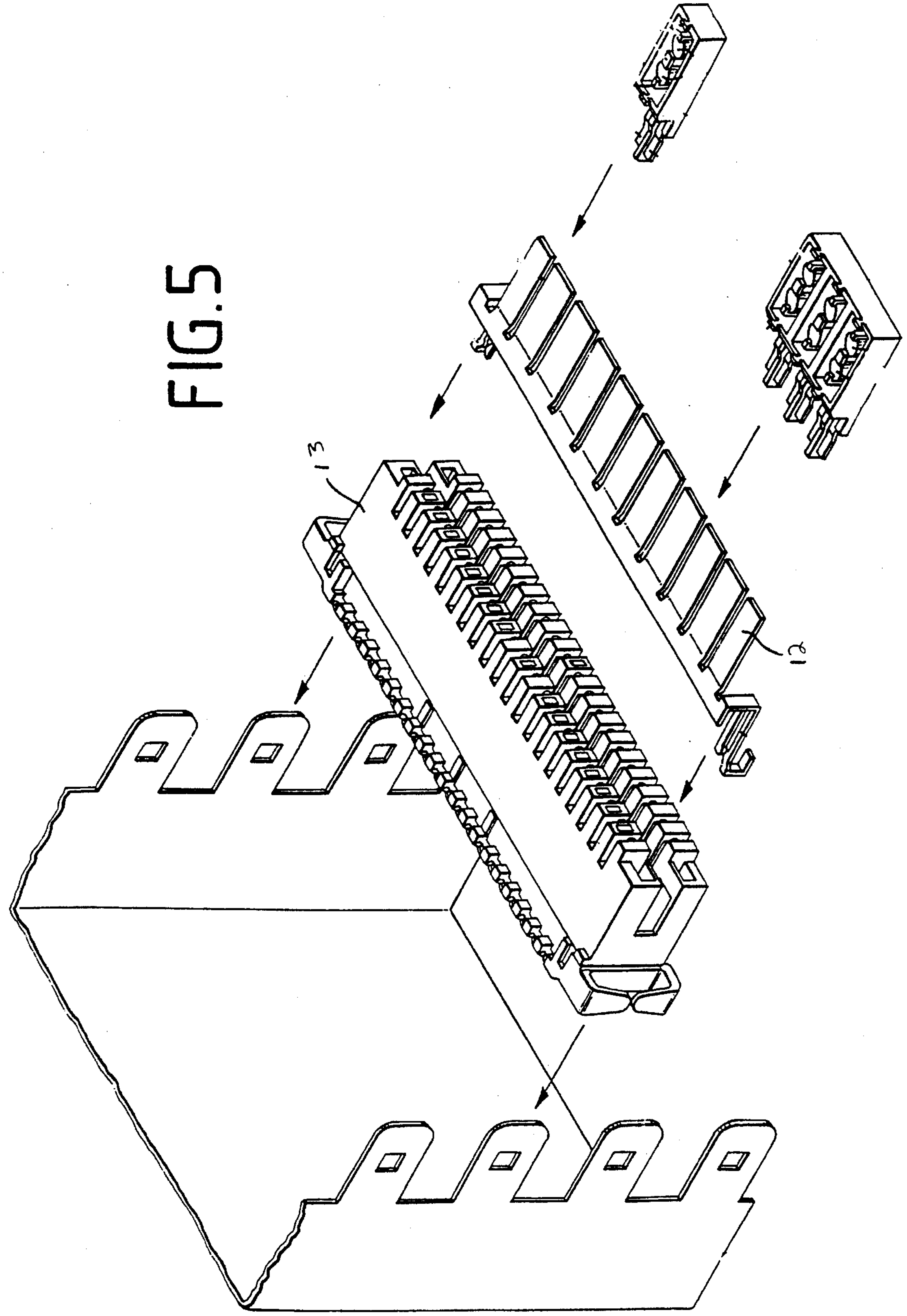

FIG. 5 is a connector or disconnector bank.

DETAILED DESCRIPTION OF THE PREFERRED EMBODIMENT

Figure 1:
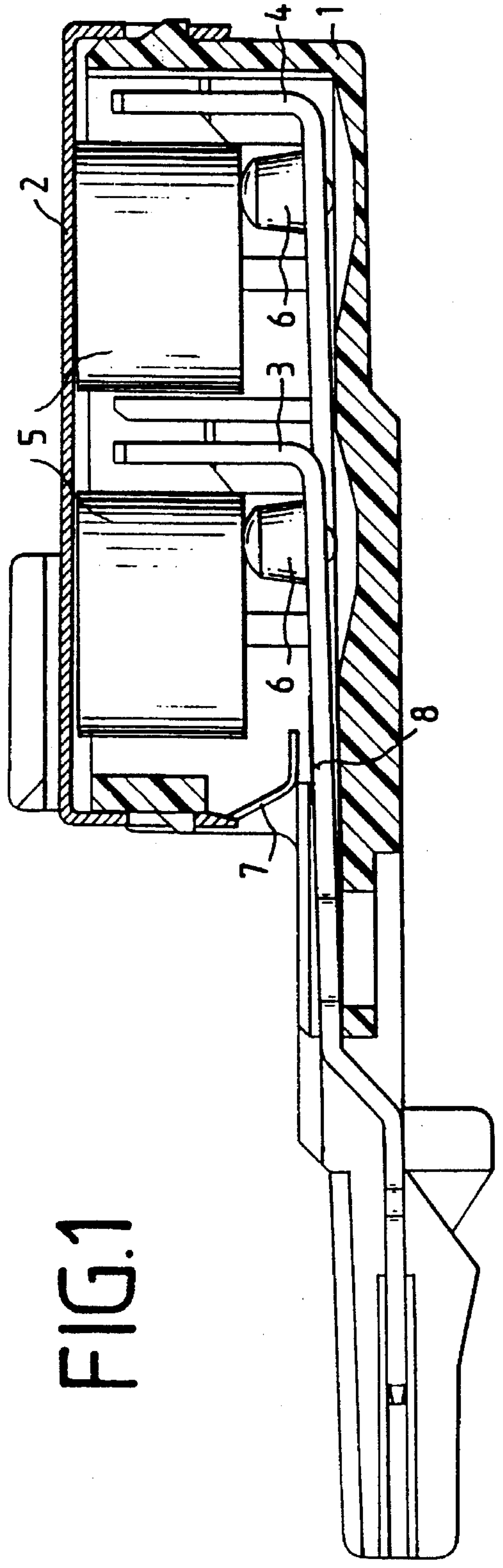
FIG. 1 is a sectional view of a voltage surge protection plug in an original condition.
Figure 2:
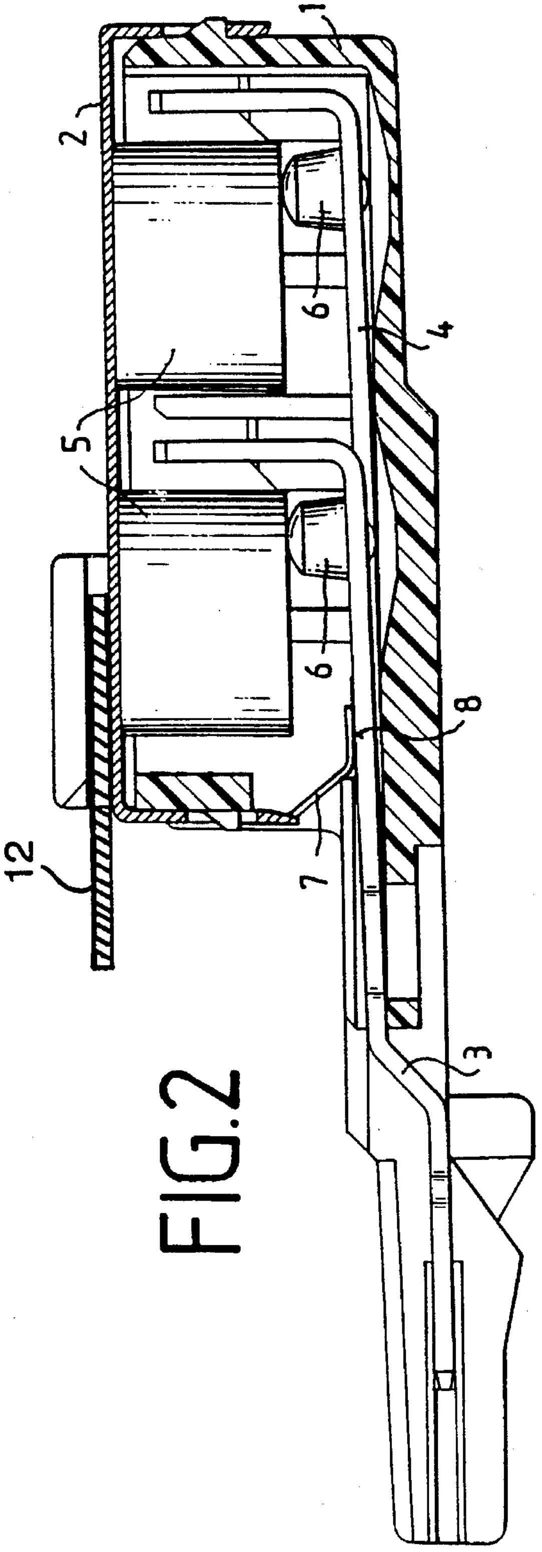
FIG. 2 is a sectional view of a voltage surge protection plug of FIG. 1 in a plugged-on condition.

Referring to the drawings, and in particular to FIG. 1, the voltage surge protection plug comprises a housing formed of a lower portion or base 1 of plastic and a cover 2 of metal. In FIG. 2, the cover 2 is in the condition of the voltage surge protection plug being plugged onto a connector or disconnector bank 13 electrically connected with collective earthing device (ground) 12 so that it forms the earth contact. Further, two plug-in tongues 3 and 4 are extended from the housing. The plug-in tongues 3 and 4 are connected in the plugged-on condition of the voltage surge protection plug with an a-wire or a b-wire, resp., of a telecommunication cable. One voltage surge suppressor 5 each is connected between the plug-in tongue 3 and the cover 2, and the plug-in tongue 4 and the cover 2, resp. In addition, between the plug-in tongue 3 or 4, and the respective voltage surge suppressor 5 one electrically conductive melt pill 6 is provided.

If an overvoltage occurs in the telecommunication system and thus between the cover 2 forming the earth contact and at least one of the plug-in tongues 3 or 4, wherein the overvoltage exceeds the response voltage of at least one of the voltage surge suppressors 5, the respective voltage surge suppressor 5 filled with an inert gas will ignite, so that the overvoltage is carried away through the low-impedance connection over this voltage surge suppressor. If the ignition of the voltage surge suppressor 5 continues, the respective melt pill will melt by the generated heat, so that the respective plug-in tongue 3 or 4, resp., resiliently biased towards the top will come into contact with the cover 2, thereby the voltage surge suppressor 5 being shorted and its destruction by heat thus being prevented.

The cover 2 is provided with two foot-type contact elements 7 which are resiliently pressed against the respective plug-in tongue 3 or 4, resp., when the voltage surge protection plug is plugged on (FIG. 2) to the connector bank 13 and earthing device 12. In the not plugged-on condition (FIG. 1), the contact elements 7 are lifted off from the respective plug-in tongue 3 or 4, resp. Between the respective plug-in tongue 3 or 4 resp., and the associated contact element 7 there exists a relatively large contact area in the plugged-on condition.

In the section where the area-type contact is formed between the contact elements 7 and the respective plug-in tongue 3 or 4, resp., when the voltage surge protection plug is plugged on, an electrical insulation foil 8 or 9, resp., is glued thereonto. The electrical insulation foil 8 or 9, resp., prevents a direct contact between the plug-in tongue 3 or 4, resp., and the associated contact element 7. The two electrical insulation foils 8 and 9 each have however a hole 10 or 11, resp., so that the plug-in tongue 3 or 4, resp., and the associated contact element 7 are separated here by an air gap of one thickness only of the electrical insulation foil 8 or 9 resp., and form a second voltage surge suppressor. The break-down voltage between the plug-in tongue 3 or 4, resp., and the associated contact element 7 or the cover 2 (collective earthing device) can therefore be adjusted by a corresponding selection of the thickness of the electrical insulation foil 8 or 9, resp. Thickness tolerances of the electrical insulation foil of maximum 3 μm permit in a simple way a high precision when adjusting different breakdown voltages.

By a corresponding selection of the holes 10 and 11 (size and shape), a strongly inhomogeneous electrical field can be formed therein between the plug-in tongue 3 or 4, resp., and the associated contact element 7, so that a characteristic breakdown behavior like in a plate/tip arrangement can be obtained. The breakdown strength is thus substantially reduced, so that for instance for a given breakdown voltage a larger electrode distance or a thicker electrical insulation foil, resp., can be used. Thereby a sufficiently large electrode distance is possible even for a low breakdown voltage, so that a welding of the electrodes can be excluded to a large extent.

While a specific embodiment of the invention has been shown and described in detail to illustrate the application of the principles of the invention, it will be understood that the invention may be embodied otherwise without departing from such principles.

What is claimed is:

1. A voltage surge protection assembly, comprising: a capsule filled with an inert gas forming a voltage surge suppressor; an electrode arrangement including two contact members electrically parallel with the voltage surge suppressor and forming an air spark gap therebetween, one of said contact members being a housing and said other of said contact members being a contact tongue; a contact element, said one of said contact members being electrically connected with said contact element, said contact element being biased toward a surface portion of said other one of said contact members; and electrical insulation foil, having a given thickness, arranged between said contact element and said other one of said contact members for an electrical disconnection, said electrical insulation foil being provided with an opening for forming the air gap between said contact element and said other one of said contact members.

2. An assembly according to claim 1, wherein said voltage surge suppressor is disposed in a voltage surge protection plug, said voltage surge protection plug having a plugged-on condition wherein said contact element rests against said film on said other one of the contact members.

3. An assembly according to claim 2, said voltage surge protection plug can be plugged onto a connector or disconnector bank for telecommunication applications.

4. An assembly according to claim 3, said one of said contact members are connected with a collective earthing device.

5. An assembly according to claim 2 wherein said one of said contact members is shaped to form a plug-in tongue.

6. An assembly according to claim 2 wherein said air spark gap is disposed in a housing of said voltage surge protection plug.

7. An assembly according to claim 2, wherein said hole in said electrical insulation foil has such a size and/or shape that a strongly inhomogeneous electrical field is formed in said air gap.

8. An assembly according to claim 1 wherein said contact element is resiliently pressed by said one of said contact members against said other one of said contact members.

9. An assembly according to claim 1 wherein said electrical insulation foil has a minimum thickness of 100 μm.

10. An assembly according to claim 1, wherein said electrical insulation foil is glued on said other one of said contact members.

11. A voltage surge protection assembly comprising:

a housing including a conductive cover and an insulative base;

a contact tongue positioned on said base and extending from inside said cover to outside said cover;

a first surge suppressor positioned inside said cover and electrically connected to said cover and said contact tongue;

a second surge suppressor positioned inside said cover, said second surge suppressor including a resilient contact element physically and electrically connected to said cover, said contact element being biased toward said contact tongue, said second surge suppressor also including an insulative film positioned between and in contact with said contact element and said contact tongue, said film defining a hole forming an air spark gap between said contact element and said contact tongue.

12. An assembly in accordance with claim 11, wherein:

said base and said contact tongue form a plug extending from said cover.

13. An assembly in accordance with claim 11, wherein:

said hole in said film has a shape to form an inhomogeneous electric field in said spark gap.

14. An assembly in accordance with claim 13, wherein:

said hole forms a breakdown behavior in said spark gap similar to a plate/tip arrangement.

15. An assembly in accordance with claim 11, wherein:

a melt pill is positioned between said contact tongue and said first surge suppressor.

16. An assembly in accordance with claim 15, wherein:

said melt pill melts when said first surge suppressor is above a predetermined temperature;

said contact tongue is biased toward said cover and comes into contact with said cover when said melt pill melts.

* * * * *